United States Patent
Thaker

(10) Patent No.: US 8,765,855 B2
(45) Date of Patent: Jul. 1, 2014

(54) REACTION-BASED LASER MARKING COMPOSITIONS, SYSTEMS AND METHODS

(76) Inventor: Jagdip Thaker, Schaumburg, IL (US)

( * ) Notice: Subject to any disclaimer, the term of this patent is extended or adjusted under 35 U.S.C. 154(b) by 0 days.

(21) Appl. No.: 13/136,288

(22) Filed: Jul. 28, 2011

(65) Prior Publication Data

US 2012/0027958 A1 Feb. 2, 2012

Related U.S. Application Data

(60) Provisional application No. 61/400,407, filed on Jul. 28, 2010.

(51) Int. Cl.
 *B41M 5/26* (2006.01)
 *B41M 5/30* (2006.01)
 *C08K 3/22* (2006.01)
 *C08K 3/32* (2006.01)

(52) U.S. Cl.
 USPC ........... 524/407; 524/413; 524/415; 524/416; 524/417

(58) Field of Classification Search
 CPC .................................................. B41M 5/267
 USPC ................... 524/407, 413–417, 431–431; 427/553–556
 See application file for complete search history.

(56) References Cited

U.S. PATENT DOCUMENTS

| | | | |
|---|---|---|---|
| 4,806,577 A * | 2/1989 | Takahashi et al. | ............ 523/445 |
| 4,861,620 A | 8/1989 | Azuma et al. | |
| 5,030,551 A | 7/1991 | Herren et al. | |
| 5,413,629 A | 5/1995 | Yasui et al. | |
| 5,528,280 A | 6/1996 | Endo et al. | |
| 5,560,769 A | 10/1996 | Conner et al. | |
| 5,853,955 A | 12/1998 | Towfiq | |
| 5,855,969 A | 1/1999 | Robertson | |
| 6,028,134 A * | 2/2000 | Zhang et al. | ................. 524/406 |
| 6,040,108 A | 3/2000 | Schadeli et al. | |
| 6,075,223 A | 6/2000 | Harrison | |
| 6,180,315 B1 | 1/2001 | Schadeli et al. | |
| 6,207,344 B1 | 3/2001 | Ramlow et al. | |
| 6,238,847 B1 | 5/2001 | Axtell, III et al. | |
| 6,313,436 B1 | 11/2001 | Harrison | |
| 6,497,985 B2 | 12/2002 | McCay et al. | |
| 6,503,310 B1 | 1/2003 | Sullivan | |
| 6,503,316 B1 | 1/2003 | Sakoske et al. | |
| 6,617,094 B2 | 9/2003 | Ozawa et al. | |
| 6,706,785 B1 * | 3/2004 | Fu | ................... 523/200 |
| 6,852,948 B1 | 2/2005 | Harrison | |
| 6,855,910 B2 | 2/2005 | Harrison | |
| 7,187,396 B2 | 3/2007 | Carroll, Jr. et al. | |
| 7,485,403 B2 | 2/2009 | Khan | |
| 7,915,564 B2 | 3/2011 | Kaplan et al. | |
| 8,048,608 B2 | 11/2011 | Jarvis et al. | |
| 8,168,711 B2 | 5/2012 | Mamak et al. | |
| 8,597,774 B2 | 12/2013 | Fukue et al. | |
| 8,627,685 B2 | 1/2014 | Hory | |
| 2003/0012891 A1 | 1/2003 | Hory et al. | |
| 2008/0026319 A1 | 1/2008 | Stroh, III et al. | |
| 2008/0113861 A1 * | 5/2008 | Watanabe et al. | ............. 503/201 |
| 2010/0018957 A1 | 1/2010 | Khan | |

FOREIGN PATENT DOCUMENTS

| | | |
|---|---|---|
| GB | 1353063 | 5/1974 |
| GB | 2 227 570 A | 1/1990 |
| JP | 2000248388 A * | 9/2000 |
| WO | WO 2008107345 A1 * | 9/2008 |

OTHER PUBLICATIONS

Machine translated English equivalent of JP 2000-248388 (Sep. 2000, 7 pages).*
Toyolnk (Pigments for Ink. Yoyo Ink Mfg. America, LLC. 2013, 2 pages).*

* cited by examiner

*Primary Examiner* — Brieann R Fink

(57) ABSTRACT

An ink formulation comprises a binder and at least one marking component, which comprises at least one metal oxide or oxyanion and at least one oxidizing/reducing agent, which absorbs laser irradiation between wavelengths of 780-10,600 nm, thereby causes the formulation to change color.

15 Claims, No Drawings

REACTION-BASED LASER MARKING COMPOSITIONS, SYSTEMS AND METHODS

CROSS REFERENCE TO RELATED APPLICATIONS

This application claims the benefit of U.S. Provisional Application Ser. No. 61/400,407, filed Jul. 28, 2010, herein incorporated by reference.

FIELD OF INVENTION

This invention relates to laser marking by oxidation/reduction reactions.

BACKGROUND OF THE INVENTION

Pigments have been proposed, which can be used to mark a substrate by the application of laser energy. Reference can be made to WO-A-00/43456, JP-A-11001065, EP-A0522370, EP-A-0797511, U.S. Pat. Nos. 5,053,440; 5,350,792; 5,928,780; 6,017,972; 6,019,831; 5,489,639 and 5,884,079.

WO02/01250 discloses the use of oxymetal salts in laser marking. AOM (ammonium octamolybdate) is an example of a material that can be marked directly with 10,600 nm laser radiation.

WO05/068207 discloses the use of NIR laser radiation (i.e. at 800 to 2000 nm) to initiate a color change reaction when a NIR-absorbing metal salt is used in combination with a substance that normally undergoes a color change reaction at much longer wavelength (about 10,600 nm), e.g. AOM.

JP8127670 discloses the use of reduced titanium oxide compounds for incorporation into thermoplastics, for the laser marking of molded products.

U.S. Pat. No. 5,911,921 discloses the use of non-stoichiometric ytterbium phosphate to produce NIR absorbing inks, e.g. for printing stealth bar codes.

SUMMARY OF INVENTION

Described herein are compositions, systems and method related to coating compositions which can be used in marking a substrate, e.g., heating or laser marking. The combination of the marking component(s) as described herein with a binder increases the durability of the mark, rendering it permanent or semi-permanent on a substrate or device to which it is applied. The present invention can utilize a laser, for example a low to high powered laser, to economically laser-mark substrates with the laser marking composition of the present invention.

This invention is based on the discovery that certain compounds absorb certain laser wavelengths, and in particular IR or Near-IR laser wavelengths. When compositions or formulations described herein are heated (using any variety of methods and in particular laser light), it causes the formulation or composition to stick (permanently or semi-permanently) to a material on which it is applied to form an image or pattern. Such an image or pattern can be formed by the localized application or irradiation with a laser in the desired pattern after uniform coating of a substrate. In some embodiments, the present invention utilizes a low-energy laser, such as a diode laser, typically emitting light at a wavelength in the range of 800 nm to 11000 nm. According to the present invention, the potential of utilizing fiber, diode, diode array and $CO_2$ lasers for imaging applications on a substrate, for example, of plastic or cardboard packaging can be realized. In some embodiments, by the application of liquid film-forming formulations (such as inks) onto various substrates to produce coatings capable of distinct colors, exposure to near-IR sources produces good results dependent primarily on the formulation of the coated pigment powders.

The present invention will become apparent from the following detailed description and examples, which comprises, in one aspect is laser marking composition comprising (i) a marking component comprising a metal oxide (the metal oxide selected from bismuth vanadate, cobalt oxide, vanadium pentoxide, copper oxide, chromium oxide, iron oxide, zirconium oxide, molybdenum oxide, red iron oxide, tungsten oxide, silica or tin oxide or a combination thereof) and an oxidizing/reducing agent (the oxidizing/reducing agent selected from potassium permanganate, sodium permanganate, calcium permanganate, ammonium permanganate, or other permanganate salt, perchlorate or a percholorate salt, chromate or a chromate salt, an inorganic peroxide, hydrogen peroxide, ionic peroxide salts, acid peroxides, sodium perborate, perborate salts, silver oxide, tetroxide, osmium tetroxide, fluorine, chlorine, sulfuric acid, acid peroxides, lithium hydroxide, chromium compounds, chromic diacids, chromium trioxide, pyridinium chlorochromate, chromate compounds, dichromate compounds, persulfuric acids, nitric acid, nitrate compounds, Lithium aluminium hydride, hydride salts, Nascent (atomic) hydrogen, Sodium amalgam, Sodium borohydride, borohydride salts, tin (II) chloride, chloride salts, Sulfite compounds, Hydrazine, zinc-mercury amalgam Diisobutylaluminum hydride, Lindlar catalyst, molybdenum oxide, Oxalic acid, Formic acid, Ascorbic acid, Phosphites, hypophosphites, phosphorous acid, phosphate, phosphate salts, zinc phosphate, copper phosphate, ammonium phosphate, tricalcium phosphate, Dithiothreitol, hydroquinone, isoascorbic acid, thiols, glutathione, polyphenols, Vitamin A, iron (II) sulfate and, optionally, (ii) a binder. Upon irradiation in a wavelength range of between about 700 nm and 14000 nm the laser marking composition bonds to a substrate to which it is contacted.

In one embodiment, the metal oxide is selected from the group consisting of bismuth vanadate, vanadium pentoxide, cobalt oxide, red iron oxide, zinc phosphate, copper oxide, chromium oxide, zirconium oxide and any combination thereof.

In one embodiment, the binder comprises: i) a resin chosen from acrylics, acrylates, alkyds, cellulose, cellulose derivatives, polysaccharides, polysaccharide derivatives, rubber resins, ketones, maleics, formaldehydes, phenolics, epoxides, fumarics, hydrocarbons, isocyanate free polyurethanes, polyvinyl butyral, polyamides, shellac, polyvinyl alcohol or any combination thereof; and ii) a solvent selected from methylated spirits, alkyl acetate, propanol, isopropanol, n-propyl acetate, toluene, xylene, cyclohexanone, alkoxyethanol, butoxyethanol, aromatic distillates having a boiling point of from about 200° C. to 310° C., water, or any combination thereof.

In one embodiment, one or more additives can be added, such as plasticizers, wax, drying additives, chelating agents, antioxidants, anionic surfactants, zwitterionic surfactants, amphoteric surfactants, nonionic surfactants, defoamers, alkali additives, reducing agents, lubricating agents, pigments, sensitizers, alumina, titanium oxide, zinc oxide, kaolin, mica or any combination thereof.

In another embodiment, the marking component further comprises a pigment composition, which can be one or a combination of monoazo pigments, C.I. Pigment Brown, C.I. Pigment Orange, C.I. Pigment Red, C.I. Pigment yellow; diazo pigments, C.I. Pigment Orange, anthanthrone pigments, anthraquinone pigments, C.I. Pigment Violet, anthrapyrimidine pigments, quinophthalone pigments, dioxazine pigments, flavanthrone pigments, C.I. Pigment Blue, isoindoline pigments, isoviolanthrone pigments, metal-complex pigments, C.I. Pigment Green; perinone pigments, perylene pigments, C.I. Pigment Black, phthalocyanine pigments, pyranthrone pigments, thioindigo pigments, triarylcarbonium pigments, Aniline Black, Aldazine Yellow, C.I. Pigment Brown and liquid crystal polymer pigments (LCP pigments).

The substrate can comprise metal, ceramic, glass, porcelain, marble, natural stone, plastic, paper, rubber, wood, cardboard or a combination thereof.

In another embodiment, the substrate is selected from the group consisting of glass, lead-free glass, ceramic tiles, sanitary ware, stoneware, porcelain, bricks, electronic quality ceramic substrates, marble, granite, slate, limestone, metal, steel, brass, copper, aluminum, tin, zinc, PVC, polyamides, polyolefins, polyethylenes, polycarbonates and polytetrafluoroethylene.

In another aspect, described herein are methods of laser marking a substrate in a desired pattern comprising: a) obtaining a laser ink formulation comprising any laser marking composition described herein; b) contacting the formulation with a substrate; and c) irradiating the formulation with a laser having a wavelength of between about 700 nm and 11000 nm, thereby causing the composition to form a semi-permanent bond to the substrate and forming the desired pattern.

Additionally, the method can comprise the step of determining a desired pattern to be formed on the substrate.

The step of contacting the composition with a substrate can, in one embodiment, comprise electrostatially applying a layer of the composition onto the substrate or, in another embodiment, spraying a layer of the composition onto the substrate.

The pattern can be any desired pattern such as a bar code, an identifying code or a name.

DESCRIPTION OF INVENTION

Described herein are reaction-based laser or heat marking (collectively referred to as "laser marking" or "ink formulation" or "ink laser formulation" or "laser ink composition", all synonymous) which combines a reaction of one or more oxidizing/reducing agents with a metal oxide (collectively, "marking component"). The marking component is optionally dispersed, mixed or combined with a binder. In some embodiments, the binder allows for better compatibility in other formulations such as coatings, etc. In one embodiment, the marking component can comprise one or more metal oxides, one or more oxyanion or a combination one or more metal oxides with one or more oxyanions. In another embodiment, marking component can comprise one or more metal oxides in combination with one or more oxidizing/reducing agents. The formulation described herein provides a high-contrast color, black or white laser mark with improved durability as compared with the current art. In some embodiments, the black and/or white and/or color laser mark is a high-contrast laser mark.

The marking component(s) (all or a portion of thereof) as described herein are efficient absorbers of radiation at a wavelength of from about 700 nm to about 12000 nm. In another embodiment, the IR absorber pigments and dyes used in this invention are an efficient absorber of radiation at a wavelength of from about 780 nm to about 10600 nm. In yet another embodiment, the IR absorber pigments and dyes used in this invention are an efficient absorber of radiation at a wavelength of from about 780 nm to about 10000 nm. The present invention's marking components in yet a further embodiment, absorbs radiation in the near infrared region (NIR) of the electromagnetic spectrum (i.e. 780 to 3000 nm).

The formulation renders the marking to be permanent or semi-permanent on a substrate or device to which it is applied to provide a high-contrast marking. The present invention utilizes low or high powered lasers to economically laser-mark substrates with the formulation as described herein. Further, the methods for providing an image on a substrate are discussed, which comprise applying, to a relatively small area of the substrate, a formulation comprising a binder and one or more metal oxides that forms a high contrast image on irradiation with laser light.

This invention is based on the discovery that an image or pattern using the formulation described herein can be formed by the localized application or irradiation with a laser in the desired pattern after uniform coating of a substrate. In some embodiments, the present invention utilizes a low-energy laser, such as a diode laser, typically emitting light at a wavelength in the range of 800 nm to 11000 nm.

It has been found that many oxyanions or metal oxides and/or oxidizing/reducing agents (optionally in combination with a binder, which in one typical embodiment is a polymer binder), absorb at the wavelength of between 800 nm to 10,600 nm (for example, using $CO_2$ laser light) and undergo a color change. In one embodiment, the color change is from a black or a dark color prior to irradiation to yellow after irradiation at a certain light wavelength. In another embodiment, the color change is from black prior to irradiation to a light or dark yellow after irradiation at a certain light wavelength. In yet another embodiment, the color change is from a first color (such as a dark color or black) prior to irradiation to a second color (including but not limited to yellow, red, green, blue, orange, purple, among others), which is different than the first color, after irradiation at a certain light wavelength. In another embodiment, the color change is from a light color prior to irradiation to a dark color such as black after irradiation at a certain light wavelength. The ink formulations as described herein are effectively laser-selective, and provide suitable material to be marked by the application of laser light.

According to the present invention, the potential of utilizing fiber, diode, diode array and $CO_2$ lasers for imaging applications on, for example, of plastic or cardboard packaging can be realized. It has been shown that, by the application of liquid film-forming formulations as described herein onto various substrates to produce coatings capable of distinct colors, exposure to near-IR sources produces good results.

The binder can be a solvent-based or aqueous-based, depending on the desired application. It is understood that the term "binder" includes a mixture of the resin and solvent, or water-compatible resin (eg. Polyvinyl alcohol, Texicryl acrylic emulsion, etc.) with water In one embodiment, the resin is chosen from acrylics and acrylates (including but not limited to copolymers of an alkyl methacrylate or alkyl acrylate), alkyds, cellulose and cellulose derivatives (including but not limited to nitrocellulose), polysaccharides and polysaccharide derivatives, rubber resins (including but not limited to chlorinated rubber and cyclised rubber), keytones (including but not limited to methyl ethyl ketone), maleics, formaldehydes, phenolics, epoxides, fumarics, hydrocarbons, isocyanate free polyurethanes, polyvinyl butyral, polyamides, shellac, polyvinyl alcohol, or any combination of the foregoing.

The solvent can be chosen from methylated spirits, alkyl acetate (including but not limited to methyl acetate, ethyl, propyl or butyl acetate), propanol, polyvinyl alcohol, isopropanol, n-propyl acetate, toluene, xylene, cyclohexanone, alkoxyethanol, butoxyethanol, aromatic distillates having a boiling point of from about 200° C. to 310° C., typically 240° C. to 290° C., or any combination of the foregoing.

The metal oxides are chosen from bismuth vanadate, vanadium pentoxide, copper oxide, chromium oxide, iron oxide, zirconium oxide, molybdenum oxide, tungsten oxide, silica, tin oxide, other metal oxide compounds or any combination of the foregoing.

In one embodiment, the marking component comprises a metal oxide mixture of bismuth vanadate, vanadium pentoxide, copper oxide, chromium oxide and zirconium oxide. In another embodiment, the marking component is a mixture of bismuth vanadate and vanadium pentoxide.

In one embodiment, the oxidizing/reducing agent is selected from potassium permanganate, sodium permanganate, calcium permanganate, ammonium permanganate, or other permanganate salt, perchlorate or a percholorate salt, chromate or a chromate salt, an inorganic peroxide, hydrogen peroxide, ionic peroxide salts, acid peroxides, sodium perborate, perborate salts, silver oxide, tetroxide, osmium tetroxide, fluorine, chlorine, sulfuric acid, acid peroxides, lithium hydroxide, chromium compounds, chromic diacids, chromium trioxide, pyridinium chlorochromate, chromate compounds, dichromate compounds, persulfuric acids, nitric acid, nitrate compounds, Lithium aluminium hydride, hydride salts, Nascent (atomic) hydrogen, Sodium amalgam, Sodium borohydride, borohydride salts, tin (II) chloride, chloride salts, Sulfite compounds, Hydrazine, zinc-mercury amalgam Diisobutylaluminum hydride, Lindlar catalyst, molybdenum oxide, Oxalic acid, Formic acid, Ascorbic acid, Phosphites, hypophosphites, phosphorous acid, phosphate, phosphate salts, zinc phosphate, copper phosphate, ammonium phosphate, tricalcium phosphate, Dithiothreitol, hydroquinone, isoascorbic acid, thiols, glutathione, polyphenols, Vitamin A, or iron (II) sulfate. In one embodiment, the oxidizing/reducing agent is selected from potassium permanganate, zinc phosphate, molybdenum oxide or sodium permanganate.

This method allows high contrast to be achieved between the image and its immediate background with substantial savings in cost, for packaging produced in high volume.

Other additives may optionally be added to the laser marking formulation. Such additives can be chosen from reaction catalysts, wax, drying additives (including but not limited to cobalt salts, manganese salts, and zirconium salts), chelating agents, antioxidants, surfactants (including but not limited to anionic surfactants, zwitterionic surfactants, amphoteric surfactants, nonionic surfactants), defoamers, alkali additives, reducing agents, lubricating agents, pigments, sensitizers or any combination thereof. Other additives include inert materials, such as alumina, titanium oxide, zinc oxide, kaolin or mica.

In one embodiment, the marking component which comprises at least one metal oxide and one oxidizing/reducing agent typically comprises 10-70% w/w of the ink formulation, in another embodiment 10-50% w/w of the ink formulation, in another embodiment 1-35% w/w of the ink formulation, in another embodiment 5-40% w/w of the ink formulation.

In one embodiment, the metal oxide is a mixture comprising: bismuth vanadate, of from about 40 to 80 wt % (weight percent) of the mixture; vanadium pentoxide, of about 10 to 30 wt % of the mixture; Copper (II) oxide, of about 5 to 15 wt % of the mixture; Chromium oxide, of about 5 to 10 wt % of the mixture; and Zirconium oxide of about 5 to 10 wt % of the mixture. In another embodiment, the marking component comprises a mixture of metal oxides comprising: bismuth vanadate, of about 40 to 80 wt % of the mixture, vanadium pentoxide, of about 10 to 50 wt % of the mixture, Copper (II) oxide (black) of about 5 to 15 wt % of the mixture. In another embodiment, the marking component is a mixture of metal oxides comprising: bismuth vanadate (about 40-80 wt % of mixture), Vanadium Pentoxide (about 30-70 wt % of mixture) and Zirconium oxide (about 5-10 wt % of the mixture).

In one embodiment, the metal oxides composition was prepared using the quantities: bismuth vanadate (about 40-80 wt %), Vanadium Pentoxide (about 10-30 wt %), Copper (II) oxide (black) (about 5-15 wt %), Chromium oxide (5-10 wt %) and Zirconium oxide (about 5-10 wt %). The components for the inventive sample were combined and blended in a Waring blender. The mixture was then calcined in a gas kiln to 1200-1325° C. for several hours and cooled slowly. The calcined mixture was pulverized to all particles less than 10 microns.

Formulations for use in the invention can be produced in solvent and binder systems such as wood lacquers, nitrocellulose lacquers, clear coats type printing inks, UV-curing inks etc.

Pigments, such as fumed silica or zinc stearate may also be utilized. Typically, pigments are utilized in an amount of 1-85% w/w of ink formulation. In other embodiment, pigments are utilized in an amount of 1-60% w/w of ink formulation. In other embodiment, pigments are utilized in an amount of 10-50% w/w of ink formulation. In one embodiment, pigment can be any one or a combination of monoazo pigments, C.I. Pigment Brown, C.I. Pigment Orange, C.I. Pigment Red, C.I. Pigment yellow; diazo pigments, C.I. Pigment Orange, anthanthrone pigments, anthraquinone pigments, C.I. Pigment Violet, anthrapyrimidine pigments, quinophthalone pigments, dioxazine pigments, flavanthrone pigments, C.I. Pigment Blue, isoindoline pigments, isoviolanthrone pigments, metal-complex pigments, C.I. Pigment Green; perinone pigments, perylene pigments, C.I. Pigment Black, phthalocyanine pigments, pyranthrone pigments, thioindigo pigments, triarylcarbonium pigments, Aniline Black, Aldazine Yellow, C.I. Pigment Brown or liquid crystal polymer pigments (LCP pigments). In another embodiment, pigments that can be utilized include: monoazo pigments C.I. Pigment Brown 25, C.I. Pigment Orange 5, 13, 36, 67, C.I. Pigment Red 1, 2, 3, 5, 8, 9, 12, 17, 22, 23, 31, 48:1, 48:2, 48:3, 48:4, 49, 49: 1, 52:1, 52:2, 53, 53:1, 53:3, 57:1, 251, 112, 146, 170, 184, 210 and 245, C.I. Pigment Yellow 1, 3, 73, 65, 97, 151 and 183; diazo pigments C.I. Pigment Orange 16, 34 and 44, C.I. Pigment Red 144, 166, 214 and 242, C.I. Pigment Yellow 12, 13, 14, 16, 17, 81, 106, 113, 126, 127, 155, 174, 176 and 188; anthanthrone pigments C.I. Pigment Red 168, anthraquinone pigments C.I. Pigment Yellow 147 and 177, C.I. Pigment Violet 31; anthrapyrimidine pigments C.I. Pigment Red 122, 202 and 206, C.I. Pigment Violet 19; quinophthalone pigments C.I. Pigment Yellow 138; dioxazine pigments C.I. Pigment Yellow 138; dioxazine pigments C.I. Pigment Violet 23 and 37; flavanthrone pigments C.I. Pigment Blue 60 and 64; isoindoline pigments C.I. Pigment Orange 69, C.I. Pigment Red 260, C.I. Pigment Yellow 139 and 185; isoindolinone pigments C.I. Pigment Orange 61, C.I. Pigment Red 257 and 260, C.I. Pigment Yellow 109, 110, 173 and 185; isoviolanthrone pigments C.I. Pigment Violet 31, metal-complex pigments C.I. Pigment Yellow 117 and 153, C.I. Pigment Green 8; perinone pigments C.I. Pigment Orange 43, C.I. Pigment Red 194; perylene pigments C.I. Pigment Black 31 and 32, C.I. Pigment Red 123, 149, 178, 179, 190 and 224, C.I. Pigment Violet 29; phthalocyanine pigments C.I. Pigment Blue 15, 15:1, 15:2, 15:3, 15:4, 15:6 and 16, C.I. Pigment Green 7 and 36; pyranthrone pigments C.I. Pigment Orange 51, C.I. Pigment Red 216; thioindigo pigments C.I. Pigment Red 88 and 181, C.I. Pigment Violet 38; triarylcarbonium pigments C.I. Pigment Blue 1, 61 and 62, C.I. Pigment Green 1, C.I. Pigment Red 81, 81:1 and 169, C.I. Pigment Violet 1, 2, 3 and 27; Aniline Black (C.I. Pigment Black 1); Aldazine Yellow (C.I. Pigment Yellow 101) and C.I. Pigment Brown 22, liquid crystal polymers (LCP pigments) or any combination thereof.

When formulated as an ink for use as a solution, dispersion or suspension, a suitable carrier liquid or solvent and other components will be chosen accordingly. For example, inks and paints can have the carrier liquid or an organic solvent such as isopropanol, methyl ethyl ketone, ethanol or ethyl acetate, optionally with amine and/or surfactant, e.g. in an amount of 20-80% w/w. The water based binders can also be used.

These compositions may be produced by using a) mechanical mixing, b) ceramic ball grinding and milling c) silverson mixing d) glass bead mechanical milling.

In some embodiments, the composition in part (for example the pigment agglomerates) or in whole can be mixed in a "three roll mill" or a "bead mill" or a "cavitation mixer". Generally, a three roll mill is a series of cambered rollers rotating in opposite directions. The pigment particles or agglomerated compound are fed into a hopper above the two rear-most rollers and is dispersed by the shear forces between the rollers. A doctor blade is fitted to the front roller to remove the dispersed product. Roll pressure, speed ratios and temperature must be carefully controlled to allow reproducible dispersion. Each of the rolls is water cooled to reduce the build up of frictional heat.

Bead Mills: A bead mill consists of a cylindrical chamber filled with beads and surrounded by a water jacket for cooling. Ink is pumped into the chamber and the beads (known as the 'charge') set in motion by a series of spinning discs or pins. The charge grinds the ink, breaking up the pigment clumps and evenly dispersing the ink. The ink then flows out of the chamber through a sieve and the charge remains behind to be re-used. The bead size depends on the viscosity and rheology of the ink. Typical bead sizes range from 1-2 mm for a high quality low viscosity product such as a gravure ink up to 4 mm for a medium viscosity paste or screen ink. The beads can be made of zirconium oxide, glass or stainless steel. Certain beads discolour certain inks, so it is important that each ink is tested with the different beads before grinding to ensure that appropriate beads are used.

Cavitation Mixers: The use of cavitation mixers for the production of resin solutions has already been discussed. However, mixers of this type are also very efficient at dispersing certain pigments, notably titanium dioxide, and allowing predispersion of a number of others. In a highly viscous ink system a cavitation mixer may be insufficient to ensure even dispersal and as a consequence an additional sweeper blade may be added.

By application of liquid film-forming inks onto various substrates, coatings capable of distinct color change can be produced. Exposure to near-IR sources can produce dramatically different results, dependent primarily on the formulation of the ink. A composition of or for use in the invention can be used to produce an IR-sensitive coating that can be applied by a range of methods such as flood-coating, flexo/gravure etc. The coating can be applied to a range of substrates such as paper, paperboard, flexible plastic film, corrugate board etc.

The marking component as described herein can be inorganic or organic in nature, depending on the specific application desired. It should have thermally stability at above 150° C., more typically above 200° C., and possess good light stability and weatherability profiles. In one embodiment, the marking component is colorless or imparts minimal color in the finished coating formulation The ink laser formulation as described herein binds, upon irradiation with a laser of certain wavelength, to a workpiece, machine, material, device or substrate (It is understood that the term "substrate" also includes a workpiece, machine, material or device.) The substrate can be made from a conductive or dielectric material, or a combination of both. Examples of suitable substrates for use with the present invention include but are not limited to metal, glass, brick, ceramic, porcelain, plastics, marble, granite, natural stone, paper, cardboard and corrugated cardboard, and the like.

Glass substrate compositions capable of being laser-marked by the present invention include lead as well as lead-free glasses such as soda lime silicates, borosilicates, aluminum silicates, fused silica and the like.

Ceramic substrates capable of being laser marked by the present invention include tiles, sanitary ware, stoneware bodies, porcelain bodies and bricks, as well as electronic quality ceramic substrates such as silica, alumina, aluminum nitride, etc.

Natural stone substrates can include marble, granite, slate, limestone and the like. Suitable metal substrates include but are not limited to steel, brass, gold, silver, platinum, copper, aluminum, tin, zinc and the like.

Typical plastic substrates include PVC, polyamides, polyolefins, polyethylenes, polycarbonates and polytetrafluoroethylene.

Combinations of the above substrate materials may also be used, such as glass coated steel workpieces, glass coated ceramic substrates or workpieces as sell as any substrate coated with an epoxy or enamel.

Exemplary substrates that can be laser-marked in accordance with the present invention include electronic devices, printed circuit boards, automotive parts, automotive glass, aerospace parts, medical devices, tooling, consumer products, packaging, glass bottles, metal cans, metal tags, bricks, tiles, coated tiles and ceramics, totes, plastic containers, plumbing, electrical and construction supplies, lighting and the like.

The composition or ink laser formulation can be applied to the substrate in any variety of applications. In one embodiment, the composition is sprayed onto the substrate. Typically, the composition is applied through use of aerosol-type spraying or airbrushing-type spraying. In this way, the application can be generally uniform in coating. In another embodiment, the composition is applied through use of a brush, including but not limited to foam brush application and bristle brush application. In another embodiment, the composition is applied as an aqueous application, including but not limited to screen printing ink application pad printing ink application and the like.

The laser mark is permanent, which means in one embodiment that such mark is resistant to both scrubbing and re-oxidation. The compounds used in the present invention can be in the form of particles having a $D_{3,2}$ average particle size in the range from 10 nm to 10 µm, typically less than 1 µm, and more typically less than 100 nm. In one embodiment, the inorganic compounds used in the present invention can be in the form of particles having an average particle size in the range from 10 nm to 10 µm.

Any suitable laser or similar irradiating device can be used in conjunction with the present invention. In one embodiment, imaging or patterning of a substrate is accomplished through the use of a diode array and $CO_2$ lasers, namely, ND:YAG (1064 nm wavelength) and industrial $CO_2$ (10,600 nm wavelength).

In another embodiment, additional color-forming components can be added to the formulation. Examples of suitable color-formers include one or more of a range of conventional materials such as electron-donating materials, e.g. phthalides, fluorans and leuco dyes, for example crystal violet lactone. Lewis acids, whether electron-accepting or acid-generating, may also be used; examples are hydroxybenzoate, bisphenol A, zinc stearate and others. In another embodiment, metallo-porphyrins, metallo-thiolenes, metallo-polythiolenes, metallo-phthalocyanines, aza-variants or annellated variants of any of these, pyrylium salts, squaryliums, croconiums, amminiums, diimoniums, cyanines and/or indolenine cyanines can be utilized.

In one embodiment, the present invention is a method of laser-marking a substrate comprising a) obtaining a laser ink formulation comprising a marking component of: a metal oxide and an oxidizing/reducing agent; b) contacting the formulation with a substrate; and c) irradiating the composition with a laser having a wavelength of between about 700 nm and 11000 nm, thereby causing the formulation to form a semi-permanent bond with the substrate.

In yet another embodiment, the present invention is a method of marking a substrate comprising: a) obtaining a laser ink formulation comprising a marking component and a binder; c) determining a desired pattern to be formed on the substrate; b) contacting the laser ink formulation with a substrate; and c) irradiating the composition in the desired pattern with a laser. Typically, the laser is in the IR or Near-IR range, having a wavelength of between about 700 nm and 11000 nm. This causes the composition to form a semi-permanent bond with the substrate in the form of the pattern.

EXAMPLE 1

Laser marking paint/ink: Nitrocellulose lacquer (20-40% solids) (one liter) in the solvents Butyl Acetate and Toluene was added to a mixture of very fine mix of calcined mixture (less than 10 microns all particles) of zinc phosphate (as oxidizing/reducing agent), Copper (II) oxide, Vanadium Pentoxide. The paste was mixed in a three roll rubber mill to disperse the oxides and binder. The resultant paste was applied on glass, metals, ceramics and plastics and were tested using 25 Watt $CO_2$ laser (10,600 nm wavelength) at 90% power, 30% speed and 1000 PPI. Upon observation, the laser mark was black in color against yellow background.

EXAMPLE 2

Nitrocellulose lacquer (one liter) in solvents Butyl Acetate and Toluene was added to a mixture of very fine mix of calcined mixture (less than 10 microns all particles) of zinc phosphate, vanadium pentoxide with tungsten oxide and cobalt oxide. The ink was mixed in a three roll rubber mill to disperse the oxides and binder. The resultant paste was applied on glass, metals, ceramics and plastics and were tested using 25 Watt $CO_2$ laser (10,600 nm wavelength) at 90% power, 30% speed and 1000 PPI. Upon observation, the laser markings were light blue in color.

EXAMPLE 3

The solids in example one were replaced with red iron oxide, Molybdenum Oxide and Vanadium Pentoxide. The ink was mixed in a three roll rubber mill to disperse the oxides and binder. The resultant paste was applied on glass, metals, ceramics and plastics and were tested using 25 Watt $CO_2$ laser (10,600 nm wavelength) at 90% power, 30% speed and 1000 PPI. Upon observation, the laser markings were grey in color.

It is apparent that embodiments other than those expressly described herein come within the spirit and scope of the present claims. Accordingly, the invention as described is not defined by the above description, but is to be accorded the full scope of the claims so as to embrace any and all equivalent compositions and methods.

The invention claimed is:

1. A laser marking composition comprising
   (I) a marking component comprising (a) a combination of vanadium pentoxide, cobalt oxide and tungsten oxide and (b) zinc phosphate; and
   (II) a binder comprising
   i) a resin selected from the group consisting of acrylics, acrylates, alkyds, cellulose, cellulose derivatives, polysaccharides, polysaccharide derivatives, rubber resins, ketones, maleics, formaldehydes, phenolics, epoxides, fumarics, hydrocarbons, isocyanate free polyurethanes, polyvinyl butyral, polyamides, shellac, polyvinyl alcohol and any combination thereof; and
   ii) a solvent selected from the group consisting of methylated spirits, alkyl acetate, propanol, isopropanol, n-propyl acetate, toluene, xylene, cyclohexanone, alkoxyethanol, butoxyethanol, aromatic distillates having a boiling point of from about 200° C. to 310° C., water, and any combination thereof,
   wherein upon irradiation in a wavelength range of between about 700 nm and 14000 nm the laser marking composition bonds to a substrate to which it is contacted.

2. The composition of claim 1 further comprising one or more additives selected from the group consisting of plasticizers, wax, drying additives, chelating agents, antioxidants, anionic surfactants, zwitterionic surfactants, amphoteric surfactants, nonionic surfactants, defoamers, alkali additives, reducing agents, lubricating agents, pigments, sensitizers, alumina, titanium oxide, zinc oxide, kaolin, mica and any combination thereof.

3. The composition of claim 1 wherein irradiation is performed a range of between about 700 nm and 11000 nm.

4. The composition of claim 1 further comprising a pigment composition selected from monoazo pigments, C.I. Pigment Brown, C.I. Pigment Orange, C.I. Pigment Red, C.I. Pigment yellow; diazo pigments, C.I. Pigment Orange, anthanthrone pigments, anthraquinone pigments, C.I. Pigment Violet, anthrapyrimidine pigments, quinophthalone pigments, dioxazine pigments, flavanthrone pigments, C.I. Pigment Blue, isoindoline pigments, isoviolanthrone pigments, metal-complex pigments, C.I. Pigment Green; perinone pigments, perylene pigments, C.I. Pigment Black, phthalocyanine pigments, pyranthrone pigments, thioindigo pigments, triarylcarbonium pigments, Aniline Black, Aldazine Yellow, C.I. Pigment Brown, liquid crystal polymer pigments (LCP pigments) or any combination thereof.

5. The composition of claim 1 wherein the substrate comprises metal, ceramic, glass, porcelain, marble, natural stone, plastic, paper, rubber, wood, cardboard or a combination thereof.

6. The composition of claim 1 wherein the substrate is selected from the group consisting of glass, lead-free glass, ceramic tiles, sanitary ware, stoneware, porcelain, bricks, electronic quality ceramic substrates, marble, granite, slate, limestone, metal, steel, brass, copper, aluminum, tin, zinc, PVC, polyamides, polyolefins, polyethylenes, polycarbonates and polytetrafluoroethylene.

7. A method of laser marking a substrate in a desired pattern comprising:
   a) obtaining a laser ink formulation comprising the composition of claim 1;
   b) contacting the formulation with a substrate; and
   c) irradiating the formulation with a laser having a wavelength of between about 700 nm and 11000 nm, thereby causing the composition to form a semi-permanent bond to the substrate and forming the desired pattern.

8. The method of claim 7 further comprising the step of determining a desired pattern to be formed on the substrate.

9. The method of claim 7 wherein the step of contacting the composition with a substrate comprises electrostatially applying a layer of the composition onto the substrate.

10. The method of claim 7 wherein the step of contacting the composition with a substrate comprises spraying a layer of the composition onto the substrate.

11. The method of claim 7 wherein the pattern is selected from the group consisting of a pattern, a bar code, an identifying code and a name.

12. The method according to claim 7, wherein the laser is selected from a fiber, diode, diode array or $CO_2$ laser.

13. The method of claim 7 wherein the substrate comprises metal, ceramic, glass, porcelain, marble, natural stone, plastic, paper, rubber, wood, cardboard, lead-free glass, ceramic tiles, sanitary ware, stoneware, bricks, electronic quality ceramic substrates, granite, slate, limestone, steel, brass, copper, aluminum, tin, zinc, PVC, polyamides, polyolefins, polyethylenes, polycarbonates, polytetrafluoroethylene or any combination thereof.

14. The method of claim 7 wherein the composition further comprises a pigment composition selected from monoazo pigments, C.I. Pigment Brown, C.I. Pigment Orange, C.I. Pigment Red, C.I. Pigment yellow; diazo pigments, C.I. Pigment Orange, anthanthrone pigments, anthraquinone pigments, C.I. Pigment Violet, anthrapyrimidine pigments, quinophthalone pigments, dioxazine pigments, flavanthrone pigments, C.I. Pigment Blue, isoindoline pigments, isoviolanthrone pigments, metal-complex pigments, C.I. Pigment Green; perinone pigments, perylene pigments, C.I. Pigment Black, phthalocyanine pigments, pyranthrone pigments, thioindigo pigments, triarylcarbonium pigments, Aniline Black, Aldazine Yellow, C.I. Pigment Brown, liquid crystal polymer pigments (LCP pigments) or any combination thereof.

15. A method for forming an image on a substrate, the method comprising the steps of:
   spraying onto the substrate a composition according to claim 1, and
   irradiating the substrate with a laser having a wavelength of between about 700 nm and 11000 nm.

* * * * *